United States Patent [19]

Ogasawara et al.

[11] E Patent Number: Re. 33,330

[45] Reissued Date of Patent: Sep. 11, 1990

[54] OUTPUT CONTROL OF SHORT CIRCUIT WELDING POWER SOURCE

[75] Inventors: Takaaki Ogasawara; Tokuji Maruyama, both of Yokohama; Masaharu Sato, Kanagawa; Yukio Hida, Kanagawa; Takashi Saito, Kanagawa, all of Japan

[73] Assignee: Kabushiki Kaisha Kobe Seiko Sho, Kobe, Japan

[21] Appl. No.: 896,104

[22] Filed: Aug. 13, 1986

Related U.S. Patent Documents

Reissue of:

[64] Patent No.: 4,546,234
Issued: Oct. 8, 1985
Appl. No.: 596,686
Filed: Apr. 4, 1984

[51] Int. Cl.[5] ..... B23K 9/09

[52] U.S. Cl. ..... 219/137 PS; 219/130.21; 219/130.51

[58] Field of Search ..... 219/130.01, 130.21, 219/130.31, 130.32, 130.33, 137 PS, 130.51

[56] References Cited

U.S. PATENT DOCUMENTS

| | | | |
|---|---|---|---|
| 3,459,920 | 8/1969 | Sevenco | 219/130.21 |
| 3,673,377 | 6/1972 | Erdmann-Jesnitzer | 219/130.01 |
| 3,792,225 | 2/1974 | Needham et al. | 219/130.21 |
| 4,300,035 | 11/1981 | Johansson | 219/130.21 |
| 4,469,933 | 9/1984 | Mizuno et al. | 219/130.21 |
| 4,485,293 | 11/1984 | Tabata et al. | 219/130.31 |

*Primary Examiner*—Clifford C. Shaw
*Attorney, Agent, or Firm*—Oblon, Spivak, McClelland, Maier & Neustadt

[57] ABSTRACT

A method of controlling the output of a power source in consumable electrode are welding in which a short circuiting phase and an arcing phase alternately take place between a consumable electrode and a workpiece in a shielding gas atmosphere, the method being characterized by repetition of a cycle of operation consisting of: a first stage of maintaining the output welding current at a first value of a relatively low level upon establishment of a short circuit across a gap between a consumable electrode and a workpiece; a second stage of maintaining the welding current at a second value of a relatively high level succeedingly to the first stage; a third stage of lowering the welding current to a third value of a low level upon detection of necking as a premonition of rupture of short circuiting molten metal between the electrode and workpiece; a fourth stage of, upon generation of an arc across a gap between the electrode and workpiece subsequent to the third stage, maintaining the welding current at a fourth value of a relatively high level exceeding the value of average welding current; and a fifth stage of maintaining the welding current at a fifth value of a relatively low level until the gap between the electrode and workpiece is short-circuited, under control of substantially constant current characteristics to feed current of constant level irrespective of variations in arc length.

14 Claims, 10 Drawing Sheets

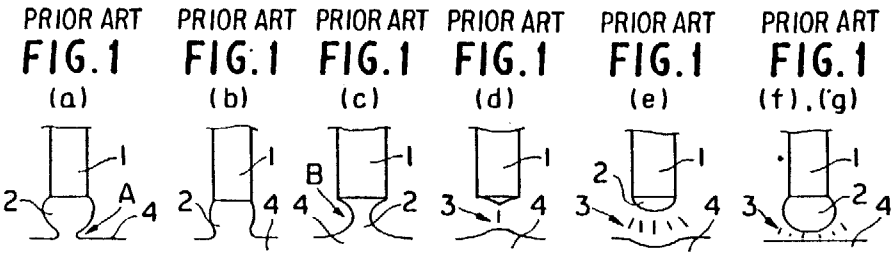
FIGURE 2 PRIOR ART
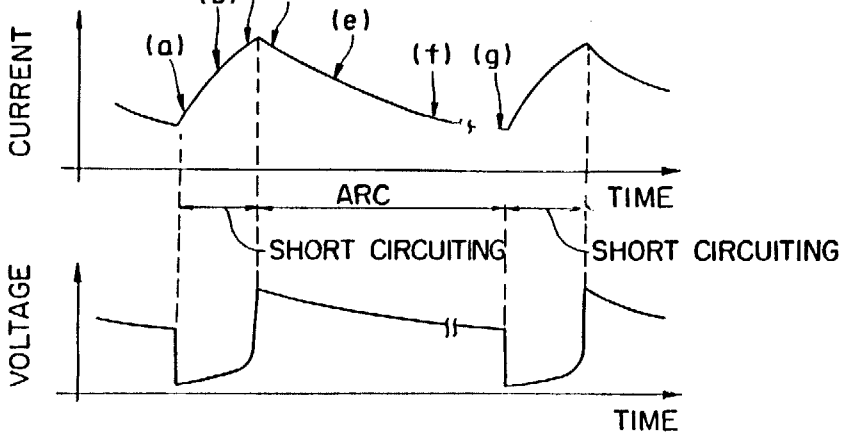

OUTPUT CONTROL OF SHORT CIRCUIT WELDING POWER SOURCE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method for controlling a welding power source, and more particularly to a method for controlling the output of a power source in shore circuit welding in which a short-circuiting phase and an arcing phase alternately take place between a consumable electrode and a base metal.

2. Description of the Prior Art

Shown in FIGS. 1(a)–(g) are sequential stages through which a molten drop is formed and transferred in one cycle of a consumable electrode welding process with alternate short circuiting and arcing phases. In these FIGURES, indicated by 1 is a consumable electrode (hereinafter referred to simply as "welding wire" for brevity), by 2 a molten drop formed at the tip end of the welding wire 1, by 3 an arc, and by 4 a weld pool or workpiece. Further, shown in FIG. 1(a) is an initial stage of short circuiting in which the molten drop 2 begins to contact the weld pool 4, in FIG. 1(b) a middle stage of the short circuiting in which the molten drop 2 is in full contact with and being transferred to the weld pool 4, in FIG. 1(c) a final stage of the short circuiting in which necking occurs between the welding wire 1 and molten pool 4 as a result of transfer of the molten drop 2 to the weld pool 4, in FIG. 1(d) the instant of restriking an arc 3, in FIG. 1(e) an initial arcing stage in which the tip end of the welding wire 1 is melted, forming a growing molten drop 2 thereat, and in FIGS. 1(f) and (g) arcing stages immediately before short circuiting by the molten drop 2 which is about to contact the weld pool 4. The stages of FIGS. 1(a) to 1(g) are repeated in the welding operation.

Referring to FIG. 2, there are shown waveforms of welding current and voltage of a conventional welding power source which has constant potential characteristics by combined use of a reactor. Reference characters (a) to (g) which indicate particular points of the waveforms in FIG. 2 correspond to the molten drop forming and transferring stages in FIGS. 1(a) to 1(g), respectively.

With such a conventional welding power source, there often arise various problems as follows. Namely, in the stage in FIG. 1(a), the welding current begins to increase with a certain time constant immediately after short circuiting between the molten drop 2 and weld pool 4, and, if the sectional area of a contact portion A of the molten drop and weld pool 4 is small, that is to say, if the welding current becomes larger before the transfer to the weld pool 4 of the molten drop 2, the short circuit is ruptured and an arc is generated, causing spattering. In the stages of FIGS. 1(c) and 1(d), necking occurs to the molten drop 2 and the short circuit is ruptured to generate an arc again. The welding current reaches a high value at this re-arcing time, and a large amount of [splattering] *spattering* is produced by repulsive energy of the arc which shakes the weld pool 4. [In the stages of FIGS. 1(d) and 1(e) which follows the onset of the arc, the welding current increases when the preceding short circuit period is long and decreases when preceded by a long short circuit period.] *In the stages of FIGS. 1(d) and 1(e) which follows the onset of the arc, the welding current decreases. However, when the preceding short circuit period is long, the current at the re-arcing reaches a higher level than that of the short period.* Accordingly, the size of the molten drop 2 which is formed the stages of FIGS. 1(d), 1(e) and 1(f) becomes irregular, and, if it is too small, an unfused portion of the welding wire 1 is struck into the weld pool 4 in the stage shown in FIG. 1(g), putting the welding operation in a considerably unstable stage. Further, the welding current should be smaller in the stage shown in FIGS. 1(g) in order to urge the molten drop 2 toward the weld pool to encourage the short circuiting. However, in these stages the welding current decreases toward the current $I=E/R$ according to the inductance L, output voltage E and equivalent resistance R in the circuit, in proportion to the value $e(-L/R^t)$ as shown in FIG. 2. Therefore, where the welding voltage has a high mean value, namely, where the welding current has a high mean value, large current flows in the stage of FIG. 1(g) to disencourage the short circuiting. Besides, as a welding power source has constant potential characteristics, reductions in arc length are reflected by current increases. Consequently, short circuiting becomes more difficult and the molten drop grows into a large size, resulting not only in irregular short circuit periods but also in [splattering] *spattering* of larger droplets.

In this connection, reference is also made to lines 43–63, column 4 of U.S. Pat. No. 3,792,225 which discloses one approach of the prior art.

SUMMARY OF THE INVENTION

In view of the above-described situations of the art, the present invention has as its object the provision of a method for controlling the output level of a consumable electrode arc welding power source in a manner to reduce [splattering] *spattering* by stabilizing the conditions or alternately repeated short circuit and arc phases.

It is a more particular object of the present invention to provide a method for controlling the output of a power source in short circuit and arc phases of consumable electrode dip transfer welding in a manner to guarantees high performance quality stably with appreciably reduced [splattering] *spattering*.

It is a further object of the present invention to provide a method for controlling the output of a power source at optimum levels in dip transfer welding with consideration of behaviors of molten metal and arcs as well as variations in arc extension length, welding wire feed rate or other conditions which impose adverse effects on the quality of the welding operation.

According to a fundamental aspect of the present invention, there is provided a method for controlling the output of a power source in consumable electrode arc welding in which a short circuiting phase and an arcing phase alternately take place between a consumable electrode and a workpiece in a shielding gas atmosphere, the method being characterized by repetition of a cycle of operation consisting of a first stage of maintaining the welding current at a first value of a relatively low level upon establishment of a short circuit between the consumable electrode and workpiece; a second stage of maintaining the welding current at a second value of a relatively high level subsequent to the first stage; a third stage of lowering the welding current to a third value of a low level upon detection of necking as a premonition of rupture of short circuiting molten metal between the electrode and workpiece; a fourth stage of, upon generation of an arc across a gap between the electrode and workpiece at the end of the third stage, maintaining the welding current at a fourth value of a relatively high level exceeding the value of average welding current; and a fifth stage of maintaining the welding current at a fifth value of a relatively low level until the gap between the electrode and workpiece is short-circuited, under control of substantially constant current characteristics to feed current of a constant level irrespective of variations in arc length.

The above-described method of the present invention can be put into reduction by various means operating on different principles or different parameters as will be discussed in greater detail hereinbelow.

The above and other objects, features and advantages of the present invention will become apparent from the following description and appended claims, taken in conjunction with the accompanying drawings which show by way of example some preferred embodiments of the present invention.

BRIEF DESCRIPTION OF THE DRAWINGS

In the accompanying drawings:

FIGS. 1a–1g are schematic illustrations showing the conventional stages through which a molten droplet is formed and transferred;

FIG. 2 is a diagram of waveforms of welding current and voltage in a conventional consumable electrode arc welding method;

DETAILED DESCRIPTION OF THE PREFERRED EMBODIMENTS

The present invention concerns the control of output of a power source in consumable electrode arc welding wherein a welding wire is fed toward a workpiece through a contact tube while blowing a shielding gas from the nozzle to thereby wrap in an arc which is generated across a gap between the welding wire and workpiece, repeating an arcing phase alternately with a short circuiting phase.

Figure 3:
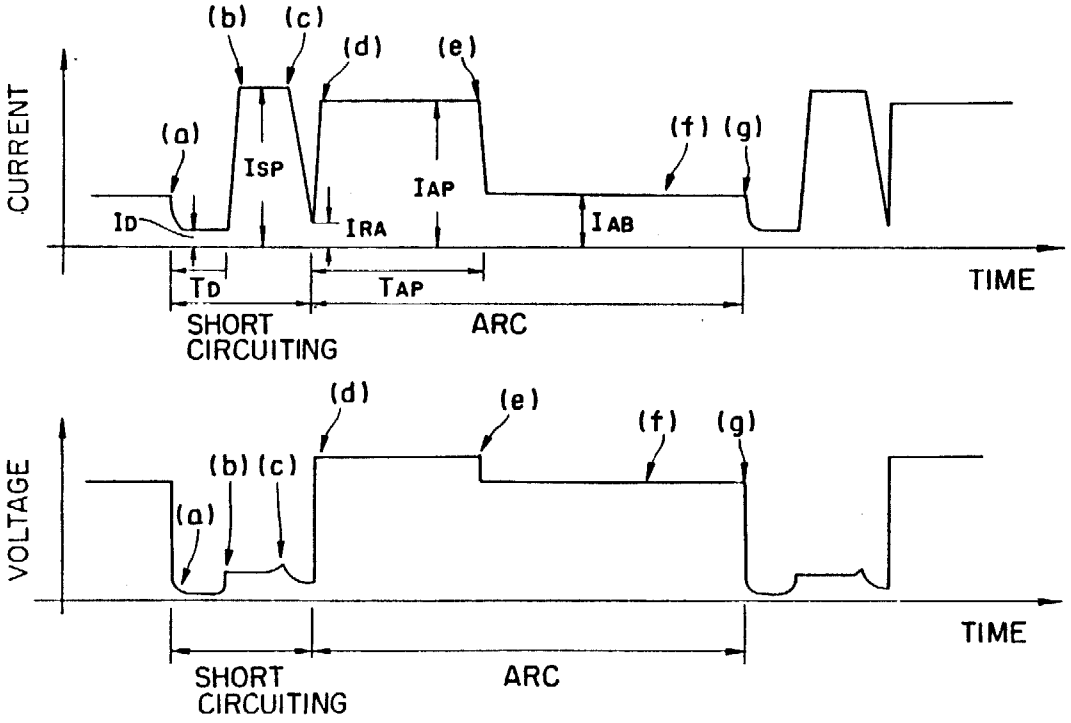
FIG. 3 is a diagram of waveforms of welding current and voltage in a consumable electrode arc welding according to the method of the present invention.

Referring to FIG. 3, there are shown output waveforms of a current and voltage which have been found to be optimum as a result of an extensive study on the welding current in consumable electrode arc welding processes involving alternate short circuit and arc phases. In the diagram of FIG. 3, reference characters (a) to (g) which indicate particular points on the current and voltage waves correspond to the drop forming and transferring stages of FIGS. 1(a) to 1(g), respectively.

In the stages (a) and (b) immediately after the short circuiting of the welding wire 1 and molten pool 4, the welding current should be a low level $I_D$ for keeping the contact portion A of a molten drop 2 and weld pool 4 from undergoing a pinching force of the welding current which is hindrous to strong contact between the drop 2 and weld pool 4. The current is retained at the low level $I_D$ for a time period $T_D$ or 1–4 msec, optimumly 1.5–2.5 msec. In order to keep the pinching force of current off at the contact portion A of the molten drop 2 and pool 4, the current is desired to be as low as possible, generally lower than 100 A. It has also been confirmed that, with a low feed rate of the welding wire 1, the current $I_D$ should be lower than that.

In the stage (b) where the bondage between the molten drop 2 and weld pool 4 becomes strong, a high current $I_{SP}$ with suitable Joule energy and pinching force is applied to accelerate the transfer of the molten drop 2 to the weld pool 4. This peak current is applied for the purpose of urging the transfer of the molten drop 2 before an unfused portion of the welding wire is stuck into the weld pool 4, and urging necking of the molten metal after the transfer. Unless the peak current, $I_{SP}$ is applied, the welding condition becomes extremely unstable. The peak current $I_{SP}$ is applied for a time period extending up to the stage (c) where necking occurs to the molten metal 2, which time period normally varies in the range of 1–5 msec and is difficult to present at a particular value. However, it is necessary to detect a necking of the molten metal by way of a variation in resistance, voltage or current across the welding wire and workpiece, for automatically controlling the current to terminate the application of the peak current $I_{SP}$ according to the extent of necking. For example, necking of the molten metal can be detected from a voltage variation over a certain time period (a differentiated value dv/dt) across the welding wire and workpiece, or by various methods which will be described hereinbelow.

In the stage (c) where necking occurs to the molten metal 2, the welding current is rapidly decreased to a low level $I_{RA}$, and in the following stage (d) an arc is generated across the gap. The rapid lowering of the welding current in the stage (c) is effected for the purpose of preventing the molten drop 2 from being partly [splattered] *spattered* by arcing upon rupture of the neck portion of the molten metal 2 and weakening the arc pressure which is applied to the weld pool at the instant of arc generation. If the arc pressure is strong, the weld pool 4 is pushed toward the outer periphery of a bead, impairing uniformity in the appearance of the bead and in some cases part of the weld pool is splattered.

There may occur doubts that the lowering of current in the stage (c) would make the rupture of the molten metal and restriking of arc difficult. However, once the molten drop undergoes necking to some extent, it is ruptured by surface tension. Accordingly, in stage (b) the high current $I_{SP}$ is applied until necking proceeds to an extend beyond which the molten metal 2 would be ruptured by surface tension and gravity. On the other hand, the low level current $I_{RA}$ is varied depending upon the wire feed rate but is desired to be in the range of 20–200 A. If the current $I_{RA}$ is lower than 20 A, it will increase the probabilities of arc extinction at the time of re-arcing, and, if higher than 200 A, it will increase the amount of [splatter] *spatter*. Ideally, the current $I_{RA}$ should be at the lowest level which will not cause arc extinction and its lower limit is not restricted to 20 A.

Upon arc generation, the welding current is raised to a peak level $I_{AP}$ in the stage (d), retaining that level for a predetermined time period extending to the stage (e). The time $T_{AP}$ from the stage (d) to (e) is the duration in which a molten drop is formed at the tip end of the welding wire for transfer to the weld pool at the next short circuiting. The time period $T_{AP}$ and the value of current $I_{AP}$ are determined such that the molten drop will grow into a desired size during the time period $T_{AP}$. If a short circuit is established between the welding wire and molten pool during this period $T_{AP}$, an unfused portion of the welding wire will be dipped in the weld pool due to premature growth of the molten drop, delaying the re-arcing and impairing the stability of welding operation. Accordingly, the current $I_{AP}$ in the period $T_{AP}$ should be at a high level which is sufficient for preventing occurrence of short circuiting.

The peak current $I_{AP}$ which is sufficient for preventing short circuiting during the period $T_{AP}$ varies depending upon the welding wire feed rate. For example, it is about 260 A when the wire feed speed is 5.2 m/min (mean welding current: 180 A), and about 340 A when the wire feed speed is 7.4 m/min (mean welding current: 240 A). The current level $I_{AP}$ must be higher than the value of mean welding current. Further, although the current increase to a sufficiently high level is useful for preventing short circuiting during the period $T_{AP}$ as mentioned above, it is also effective to resort to constant potential characteristics which tend to repress short circuiting by increasing current in response to reductions in arc length. In this case, the current increase will augment the force of arc as well as the burn-up rate of the welding wire so as to broaden the gap between the molten drop and weld pool.

In the stages (e) and (f) subsequent to the formation of a molten drop during the time period $T_{AP}$, the welding current is retained at a low level $I_{AB}$ in order to short-circuit the molten drop into the weld pool as soon as possible. This is because, in the case of constant potential characteristics, the current is increased by reductions in arc length and therefore the force of arc is increased upon the approach of short circuiting, depressing the weld pool by the increased arc force in a manner to maintain a gap between the molten drop and weld pool, thus creating a stage which disencourages short circuiting. Accordingly, it is desirable to have substantially constant current characteristics in the stages (e) and (f) to supply constant current irrespective of reductions in arc length. Besides, if the level of current $I_{AB}$ is too high, the short circuiting is delayed and the molten drop grows into an unnecessarily large size, resulting in irregular short circuit periods and [splattering] *spattering* of large molten drops. The low arcing current $I_{AB}$ is maintained until the stage (g) at which the short circuiting occurs.

The conditions in the foregoing five stages take place continuously and are sequentially repeated in one cycle of operation. Since the respective stages are correlated with each other, omission of any one of these stages will fail to meet the three fundamental conditions, i.e., reduction of [splatter] *spatter*, good bead appearance, and stability of arc.

Given below are examples of the above-described method of the present invention, in comparison with corresponding examples of the conventional method.

EXAMPLES

Following are the welding conditions which were commonly employed in Examples 1 to 3 below.

Welding wire: YCW-2, 1.2 mm in diameter
Shield gas: $CO_2$, 20 l/min
Workpiece: SS41, 12 mm in thickness
Welding method: 10 minutes' bead-on-plate welding with a welding torch supported on a carriage.

Other welding conditions such as wire feed rate, time periods $T_D$ and $T_{AP}$, current levels $I_D$, $I_{SP}$, $I_{RA}$ and $I_{AP}$ in Examples of the invention are shown in Table 1, along with wire feed rate and mean current levels in the conventional examples.

TABLE 1

| | Wire Feed rate (m/min) | $T_D$ (msec) | $I_D$ (Amp) | $I_{SP}$ (Amp) | $I_{Rt}$ (Amp) | $T_{tP}$ (msec) | $I_{tP}$ (Amp) | $I_{tB}$ (Amp) |
|---|---|---|---|---|---|---|---|---|
| eXAMPLE 1 | 5.2 | 2 | 10–50 | 350 | 50–150 | 11 | 260 | 50 |
| 2 | 6.8 | 2 | " | 400 | " | 14 | 300 | 70 |
| 3 | 8.4 | 2 | " | 450 | " | 17 | 340 | 85 |
| C. Ex. 1 | 5.2 | | | Mean current: 180 A | | | | |
| 2 | 6.8 | | | Mean current: 210 A | | | | |
| 3 | 8.4 | | | Mean current: 240 A | | | | |

The performance quality was evaluated according to the amount of [splattering] *spattering* as measured by way of the weight of spatter deposition on the nozzle during a period of 10 minutes, arc stability as observed from the welding current waveforms on an oscilloscope, and bead appearance. The results of evaluation are shown in Table 2 together with the results of evaluation of the conventional Examples 1 to 3.

TABLE 2

| | Weight of spatter deposition on nozzle (g/10 mm) | Arc Stability | Whisker at bead edge |
|---|---|---|---|
| Example 1 | 0.6 | Stable | Nil |
| 2 | 0.8 | | " |
| 3 | 1.0 | | " |
| C. Ex. 1 | 3.1 | Inferior | " |
| 2 | 4.2 | to Ex. of | Yes |
| 3 | 5.9 | Invention | " |

Figure 4:
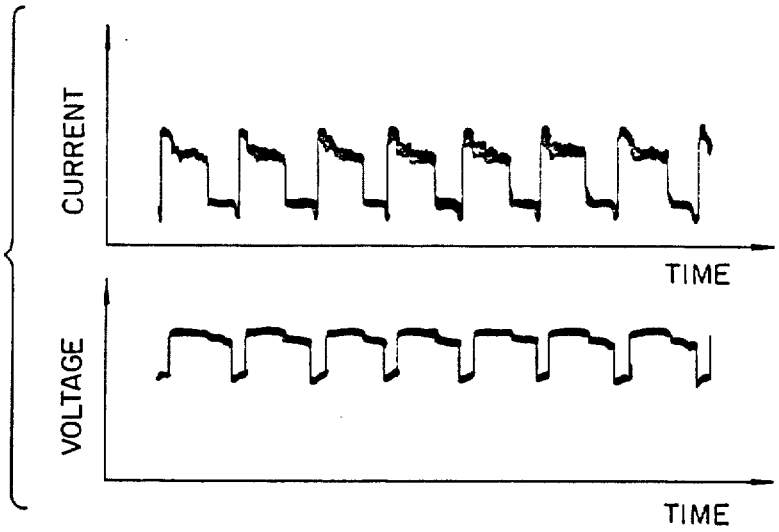
FIGS. 4 and 5 are diagrams of waveforms of welding current and voltage as observed on an oscilloscope in Example 2 of the invention.
Figure 5:
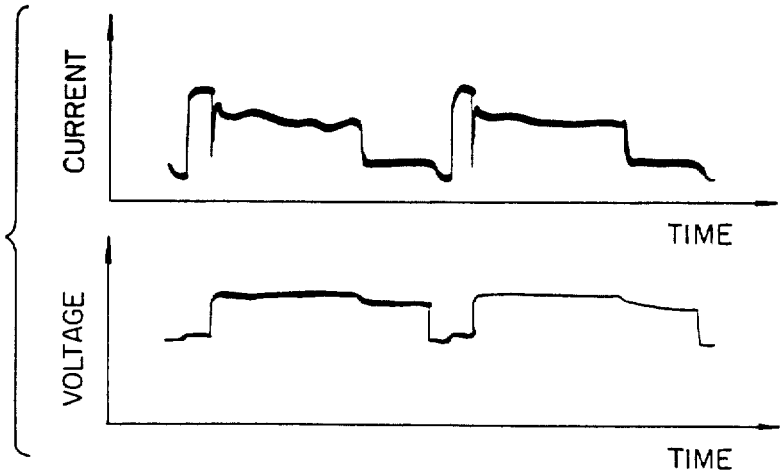
Figure 6:
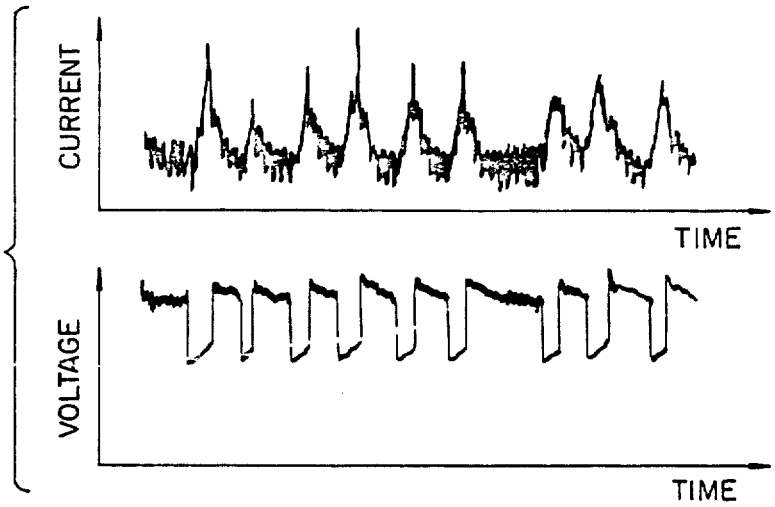
FIGS. 6 and 7 are waveform diagrams of welding current and voltage as observed on an oscilloscope in Comparative Example 2 representing the conventional method.
Figure 7:
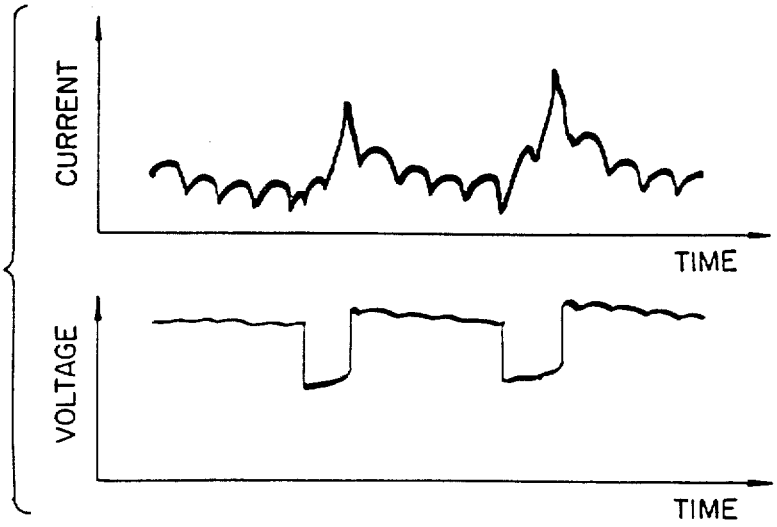

Referring to FIGS. 4 and 5, there are shown waveforms of welding current and voltage in Example 2 as observed by an oscilloscope. In FIG. 5, the waveforms are shown on a time axis of a smaller scale than in FIG. 4. On the other hand, FIGS. 6 and 7 show the waveforms of welding current and voltage in Conventional Example 2 as observed on an oscilloscope, using in FIG. 7 a time axis of a smaller scale than in FIG. 6.

As is clear from Table 2, in any one of Examples 1 to 3 of the present invention, the amount of [splatter] *spatter* is reduced to 1/5 to 1/6 of the amounts marked by the conventional method.

As seen in FIG. 4, the welding current in the method of the present invention is regular in period and peak value of the welding current. This means that short circuiting and arcing are repeated regularly with stability in arc force, arc length, molten drop diameter, short circuiting behavior, weld pool condition etc. Namely, according to the method of the present invention, it becomes possible to reduce the amount of [splatter] *spatter* and obtain uniform and clean bead appearance, improving the performance quality of welding operation to remove the necessity of any post treatment. On the other hand, the waveform of welding current in the conventional method is irregular in period and peak value as seen in FIG. 6. It follows that short circuiting and arcing occur in a random fashion, with fluctuating variations in arc force, arc length and molten drop diameter. That is to say, the operation according to the conventional method suffers from instability of the arc, disturbances of the weld pool and a large amount of [splatter] *spatter*, and the performance quality is impaired by the sporadically varying arc force which sometimes reaches an extraordinarily high level, splashing the weld pool and deteriorating the bead appearance by forming a whisker-like projection at the bead edge.

In actual operations according to the method of the present invention, the stability of the arc was confirmed from visual observation and arc sound which corresponded to the waveform of FIG. 4.

Figure 8:
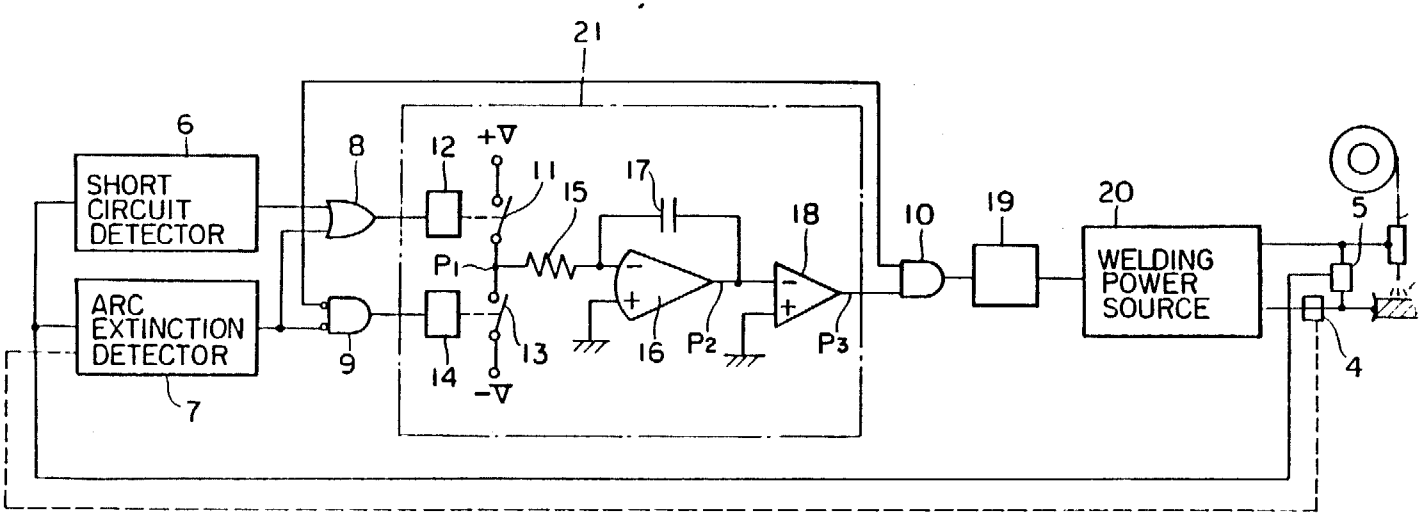
FIG. 8 is a block diagram of an output control system embodying the present invention.
Figure 9:
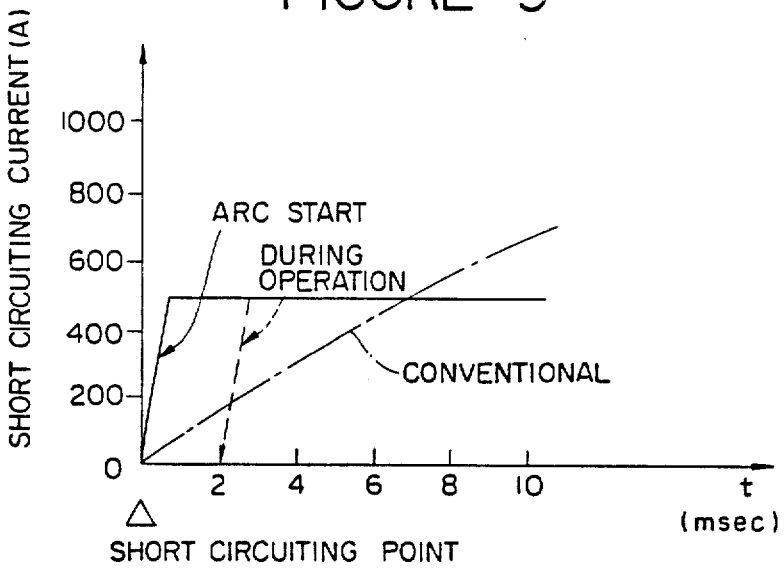
FIG. 9 is a diagram plotting the characteristics of the short circuit current under the control of the system of FIG. 8 and of short circuit current of the conventional power source.

In the first stage mentioned above, it is preferred to control the duration of the first stage depending upon whether or not an arc exists immediately before the establishment of a short circuit. FIGS. 8 and 9 show an output control system which can serve this purpose.

More specifically, shown in FIG. 8 is a system for controlling the output of a welding power source, including a welding voltage detector 5 which detects the welding voltage and is connected to input terminals of a short circuit detector 6 and an arc extinction detector 7. The output terminal of short circuit detector 6 is connected to a first input terminal of an OR circuit 8, a first inverted input terminal of an AND circuit 9, and a first input terminal of an AND circuit 10. The output terminal of arc extinction detector 7 is connected to a second input terminal of OR circuit 8 and a second inverted input terminal of AND circuit 9. The output terminal of OR circuit 8 is connected to an input terminal of a switch drive circuit 12 which opens and closes a switch 11, while the output terminal of AND circuit 9 is connected to an input terminal of a switch drive circuit 14 which opens and closes a switch 13. The switches 11 and 13 are connected in series between power sources which supply a positive voltage +V and a negative voltage −V, respectively. A node P1 between the switches 11 and 13 is connected to a first input terminal of an operational amplifier 16 through a resistor 15, and a capacitor 17 is connected between the first input terminal and an output terminal of the operational amplifier 16. The second input terminal of the operational amplifier 16 is grounded. Further, output terminal P2 of the operational amplifier 16 is connected to a first input terminal of a comparator 18. The second input terminal of the comparator 18 is grounded, and its output terminal P3 is connected to the second input terminal of AND circuit 10. The output terminal of AND circuit 10 is connected to an input terminal of a second stage current $I_{SP}$ setting circuit 19, the output terminal of which is connected to an input terminal of a welding power source 20. A timer is constituted by the section which is enclosed by a to chain line, including the above-mentioned switches 11 and 13, resistor 15, capacitor 17, operational amplifier 16 and comparator 18.

When welding operation proceeds by alternately repeating short circuiting and arcing, a short circuit is detected by the short circuit detector 6 which receives from the welding voltage detector 5 signals indicative of welding voltage levels. Upon detection of a short circuit, the detector 6 produces an output signal of a "high" level, so that OR and AND circuits 8 and 9 produce output signals of "high" and "low" levels, respectively. Then, switch 11 is closed by operation of switch drive circuit 12, and switch 13 is opened by operation of switch drive circuit 14. Accordingly, the voltage at the output terminal P2 of the operational amplifier 16 is reduced according to a time constant as determined by resistor 15 and capacitor 17. If the voltage at the output terminal P2 drops to OV or lower, the comparator 18 produces a signal of "high" level at its output terminal P3. The signal at the temrinal P3 is fed to the second stage current $I_{SP}$ setting circuit 19 through AND circuit 10, and the circuit 19 produces a signal which turns the output of the welding power source 20 to the second stage current $I_{SP}$ of high level. Thus, the second stage current $I_{SP}$ is fed to the welding wire 1.

In the absence of a short circuit or arc extinction, namely, in the presence of an arc, the output signals of the short circuit detector 6 and arc extinction detector 7 are both at a "low" level, so that the output signals of OR and AND circuits 8 and 9 are at "low" and "high" levels respectively. The switch 11 is therefore opened by operation of the switch drive circuit 12, while the switch 13 is closed by operation of the switch drive circuit 14. Accordingly, the output terminal P2 of the operational amplifier 16 retains a positive voltage, and the output terminal P2 of the comparator 18 turns to the "low" level. The output signal of AND circuit 10 is at "low" level, so that a signal commanding output of short circuit current is not fed to the welding power source 20 from the second stage current $I_{SP}$ setting circuit 19.

Should arc extinction occur during an arcing period, this is detected by the arc extinction detector 7 and its output signal rises to "high level", turning the output signals of OR and AND circuits 8 and 9 to "high" and "low" levels, respectively. Consequently, the switch 11 is closed by operation of the switch drive circuit 12, and the switch 13 is opened by operation of the switch drive circuit 14, lowering the voltage at the output terminal P2 of the operational amplifier 16 according to a time constant as determined by the resistor 15 and capacitor 17. As soon as the voltage at the temrinal P2 drops to OV or lower, the output terminal P3 of the comparator 18 turns to the "high" level. Thereafter, if short circuiting takes place by contact of a molten drop at the distal end of the welding wire with the weld pool, the output terminal of the short circuit detector 6 turns to the "high" level, holding the output signal of OR circuit 8 continuously at "high" level while turning the output signal of the AND circuit 10 to the "high" level. Accordingly, the short circuit current setting circuit 19 is actuated to supply the welding power source 19 with a signal commanding output of the second stage current $I_{SP}$. In response to this signal, the welding power source 20 feeds the second stage current to the welding wire.

Before starting welding, there is no arc across the gap, so that the arc extinction detector 7 is actuated to hold the output signals of OR and AND circuits 8 and 9 at "high" and "low" levels, respectively. Further, the switches 11 and 13 are held in closed and open states by the switch drive circuits 12 and 14, respectively. Accordingly, a negative voltage appears at the output terminal P2 of the operational amplifier 16, producing an output signal of the "high" level at its output terminal P3. If the welding wire 1 is short-circuited to a workpiece 4 in this state for starting an arc, the short circuit detector 6 is actuated to produce a signal of the "high" level at its output terminal, and the output and of AND circuit 10 turns to the "high" level, actuating the second stage current $I_{SP}$ setting circuit 19 to supply the welding power source 20 with a signal commanding output of the second stage current $I_{SP}$. In response thereto, the welding power source 20 feeds the second stage current $I_{SP}$ of the high level. That is to say, at the time of arc start, the second stage current $I_{SP}$ of the high level is supplied as soon as a welding wire is short-circuited to a workpiece, and a molten drop is formed at the distal end of the welding wire in a short time period, starting an arc upon rupture of the molten metal bridge.

In this system, one arc extinction detector 7 is composed of a comparator which have a predetermined comparate level signal and outputs the signal of "high" level receiving the no load voltage signal from a welding voltage detector 5. The welding voltage is 20–45 Volt in arc generation, whereas the no load voltage is about 65 Volt in arc extinction, so the detector can detect the arc extinction by predeterming a comparate level between the welding voltage and no load voltage.

Another arc extinction detector 7 is composed of a comparator which outputs the signal of "high" level in absence of the current signal from a welding current detector 4 (as shown by broken line in FIG. 8).

As is clear form the current rise diagram of FIG. 9, the short circuit current shows a quick rise toward the second stage current level immediately after short circuiting without the first stage at the time of arc start and after a predetermined time of the first stage in an ordinary state of welding operation, in contrast to the low rising rate of short circuit current which is supplied from the conventional power supply.

In order to terminate the second stage period in the short circuit phase at a point in time when necking occurs at the short circuiting molten metal between the welding wire and workpiece, for preventing [splattering] *spattering* at the onset of an arc, the control circuit may be arranged to lower the welding current when a difference $\Delta V$ between a minimum welding voltage $V_L$ at a certain time point of the second stage period and a voltage $V_M$ at a subsequent time point reaches a predetermined value, namely, when the value of $\Delta V = V_M - V_L$ equals a preset value. Although the spatter can be reduced to a considerable degree by this control, it is preferred to introduce into the control a voltage increment $V_N$ due to the increasing resistance of a wire extension upon elapse of time t from the second stage, as expressed by the following equation.

$$V_N = \int_0^t k \cdot V(t) \cdot dt$$

where V(t) is the welding voltage in the second stage, k is the constant according to welding wire diameter and material. The integration starts to calculate $V_N$ when the second stage starts.

Figure 10:
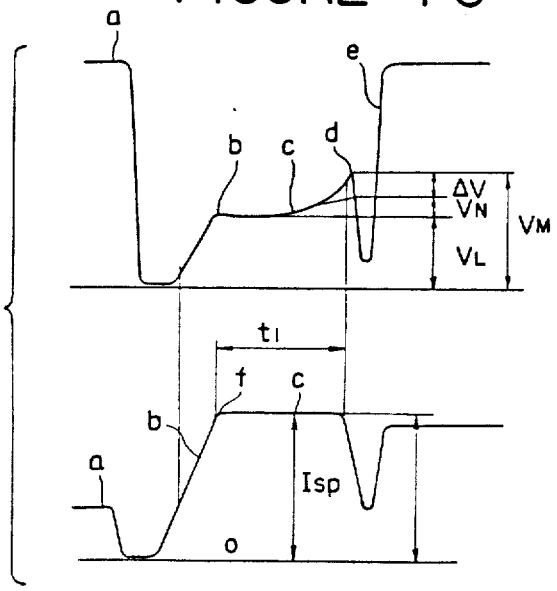
FIG. 10 is a diagram illustrating the welding current and voltage waveforms employed for explanation of detection of necking in a short circuit phase from a variation in welding voltage.

In a short circuiting state of a welding operation, the minimum welding voltage $V_L$ is stored in a memory after the welding current reaches the second stage level $I_{SP}$ as shown in FIG. 10. Then, a voltage increment $$V_N = \int_0^t kV(t) \cdot dt$$

for a period c is calculated with regard to a particular function V(t). After this, the welding voltage $V_M$ is measured contineously, and the welding current is lowered at a time $t_1$ when $\Delta V = \{V_M - (V_L + V_N)\}$ reaches a predetermined value, which corresponds to the point in time when necking occurs. According to the results of experiment, at the welding wire the diameter is 1.2 mm and the peak current $I_{sp}$ is 400 A, $\Delta V$ is 0.3–0.6 V and the voltage $V_N$ after 1 millisecond is 0.20–0.25 V.

Figure 11:
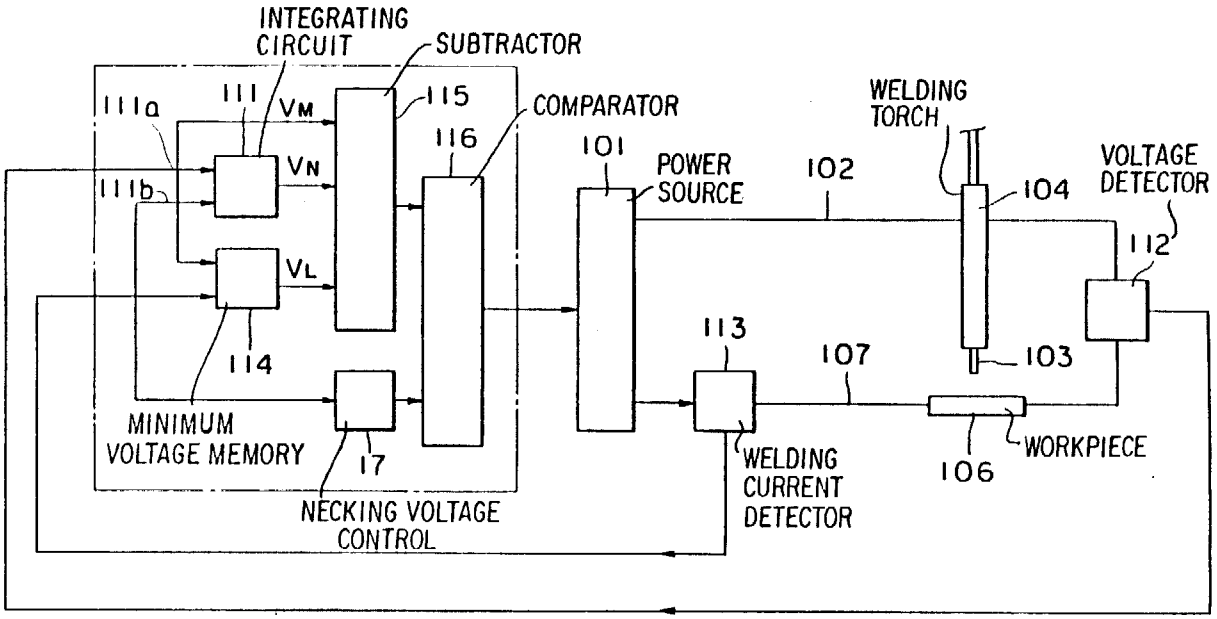
FIG. 11 is a block diagram of an output control system which is constructed to operate under the principles of FIG. 10.

Shown in FIG. 11 is an example of the control system which is constructed to this effect, wherein an integrating circuit 111 receives at one terminal 111a the output of a voltage detector 112 which detects the voltage across a welding torch 104 and a workpiece 106, and at the other terminal 111b a signal supplied from a welding current detector 113 which indicates the current flowing through the welding wire 103, to integrate the welding voltage from a point in time when the welding current through the wire 103 reaches the second stage current level $I_{SP}$, for example, from point b of FIG. 10. A minimum voltage memory 114 stores the lowest value of voltage after the welding current reaches the second stage current level $I_{SP}$ in a short circuit condition.

Indicated at 115 is a subtractor which receives a signal corresponding to the welding voltage $V_M$ from the voltage detector 112, a signal corresponding to the integrated voltage $V_N$ from the integrating circuit 111 and a signal of the lowest voltage $V_L$ from the minimum voltage memory 114, to calculate $\Delta V = V_M - (V_L + V_N)$. The results of calculation $\Delta V$ is fed to one input terminal of a comparator 116, which receives at the other input terminal a signal of a preset value $E_V$ from a necking voltage control 117. The comparator 116 applies a signal to the power source 101 when a condition of $\Delta V = E_V$ is reached, to lower the welding current to a level which would not cause [splattering] *spattering* upon arcing.

Similar effects can be obtained by arranging the output control system to lower the welding current by detecting necking of short circuiting molten drop from calculation of the resistance of a welding wire in each short circuit phase. This system lowers the welding current when the value of $\Delta R = R_M - (R_L + R_N)$ reaches a preset value in each short circuit phase. In the foregoing equation, $R_M$ is the resistance at the point in a time when necking occurs, $R_L$ is the minimum resistance in a short circuit phase, and $R_N$ is a increment in resistance in a given time length after short circuiting.

Alternatively, the necking of the molten metal bridge can be detected by sequentially detecting the welding voltage which tends to increase toward a necking point due to reductions in sectional area of the short circuit metal bridge in each short circuit phase as seen in FIG. 2, lowering the welding current when a differentiated value dv/dt of the welding voltage V reaches a predetermined value which is determined according to the duration of the second stage phase and wire extension length. This method permits detection of the point in point of necking occurring free of errors as caused by variations in wire extension length and duration of the short circuit phase which occur from time to time in actual welding operations.

In this case, the control system includes a differentiator which receives the output signal of a welding voltage detector to differentiate the voltage increment by time t. The signal of dv/dt which is produced by the differentiator is fed to a comparator which compares the value of dv/dt with a preset value and, if differential value dv/dt becomes greater than the preset value, sends out a signal to a current control of a power source to lower the welding current.

The point in time of necking in the short circuit phase can also be detected in a similar manner by detecting the resistance across a welding wire and a workpiece in the short circuit phase and using differential resistance dR/dt as an operating factor instead of the differential voltage dv/dt.

Figure 12:
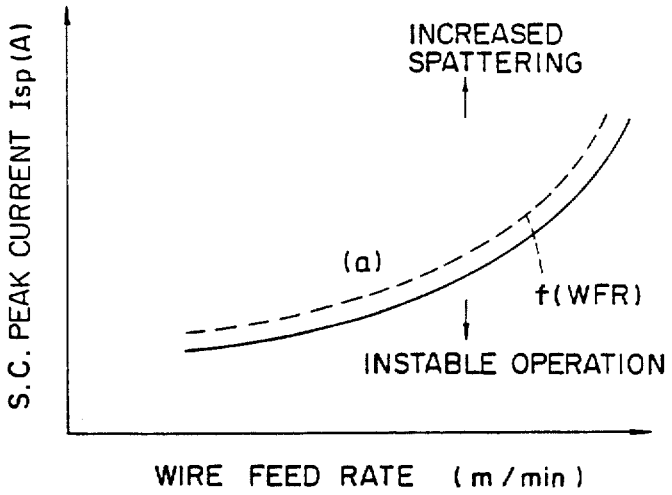
FIG. 12 is a diagram plotting a quadratic function of the wire feed rate.

Further, for the purpose of suppressing the [splattering] *spattering* to a minimum and to repeat the short circuiting and arcing regularly, it is preferred to vary the peak current $I_{SP}$ of the short circuit phase according to a function of a wire feed rate WFR to control the peak current $I_{SP}$ to an optimum level with respect to a given wire feed rate, by the use of a function generator which is connected to a wire feed motor speed detector and adapted to produce a function f(WFR) varying as indicated by broken line in FIG. 12.

The relationship between the wire feed rate WFR and the function f(WRF) is determined experimentally so that the peak $I_{SP}$ will be at an optimum level which guarantees smooth and [splatter-free] *spatter-free* welding operation, in the following manner.

According to experiments, the peak current $I_{SP}$ of the short circuit phase has a critical level varying relative to the wire feed rate WFR as indicated by solid line in FIG. 12. Namely, a short circuit peak current in a range below the critical level is too low to provoke necking within a suitable time period, resulting in prolongation of the time length $T_{SP}$ and destabilizing the welding operation by wire adhesion to a workpiece. On the other hand, welding is feasible in a range above the critical level but, although the maximum allowable level of the peak current $I_{SP}$ depends on the capacity of the power source which feed power to a welding wire, the higher the level of the peak current $I_{SP}$ the greater becomes the amount of [splatter] *spatter*. Therefore, the function $I_{SP} = f(WFR)$ which governs the short circuit peak current $I_{SP}$ according to the wire feed rate should be determined to fall in a range sufficiently higher than the critical level shown by solid line in FIG. 12 to ensure stable welding operation and at the same time should preferably lie as close as possible to the solid line to hold [splattering] *spattering* to a minimum.

A peak current $I_{SP}$ of too high a level will shorten the peak current period $T_{SP}$ and increase [splattering] *spattering*. It can be shown from a number of experiments that the high current period $T_{SP}$ should be optimally in the range of about 1–3 msec in order to repeat short circuiting and arcing regularly, though it also depends on the diameter of the welding wire. Accordingly, the above-mentioned function is desired to be determined in consideration of these factors.

Figure 13:
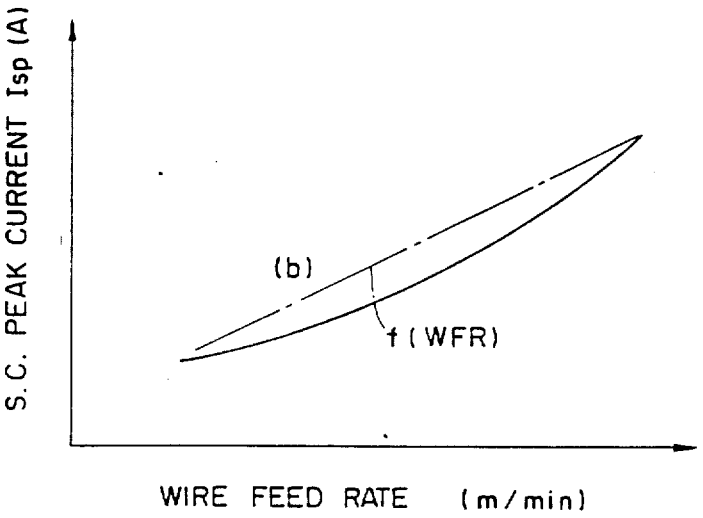
FIG. 13 is a diagram plotting a linear function of the wire feed rate.

For example, considering the peak current $I_{SP}$ in relation to the kind and diameter of the welding wire and the trend of its critical level relative to the wire feed rate WFR, the function f(WFR) can be expressed by a quadratic function as indicated by the broken line in FIG. 12. Instead of a quadratic function, it may be approximated to a linear function as indicated by the chain line in FIG. 13 within a range which will avoid problem in actual operations.

Figure 14:
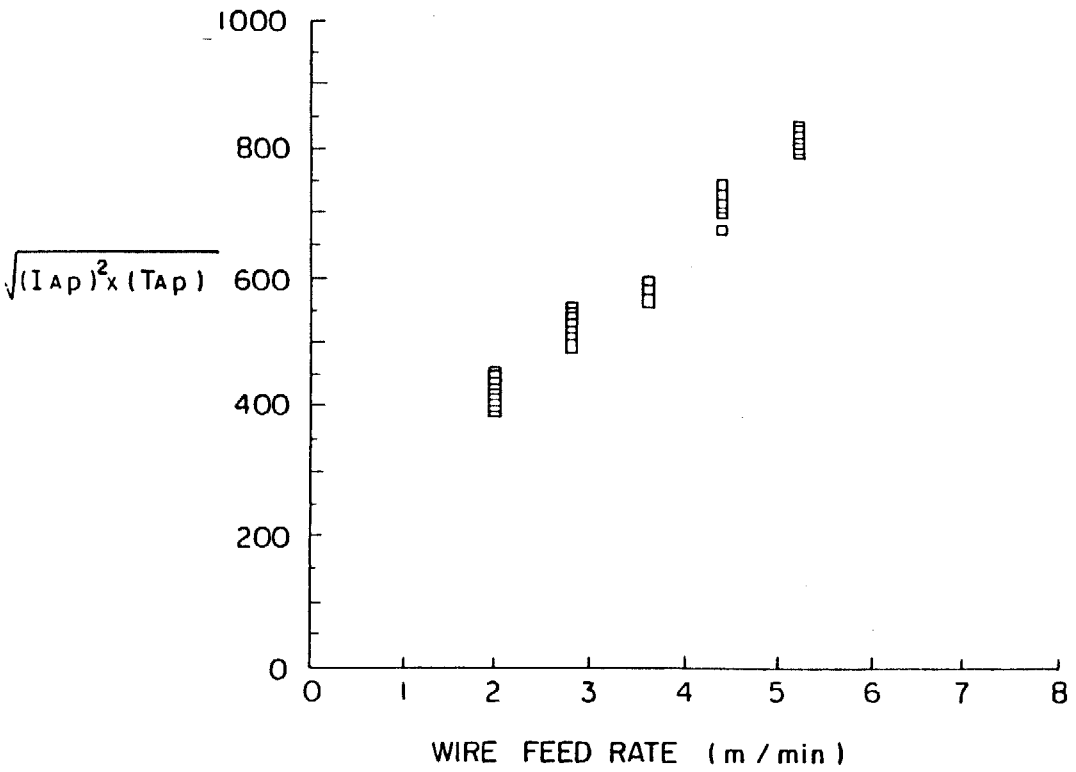
FIG. 14 is a diagram showing the relation between the wire feed rate and the value of $\sqrt{I_{AP}^2 \times T_{AP}}$.

With regard to the control of arc current, it has been known from experiments that the value of peak current $I_{AP}$ in the arc phase should be determined in relation with the value of peak current retention time $T_{AP}$ from the standpoint of suppressing [splatter] *spatter* and effecting stable transfer of molten drops. For example, the peak retention time $T_{AP}$ is preferred to be shortened with a peak arc current $I_{AP}$ of a higher level. In the dip transfer welding, the formation of a molten drop is considered to proceed in relation with the wire feed rate WFR and the effective value of welding current, namely, in relation with the value of $(\text{current})^2 \times (\text{time})$. A study on the relationship of the peak arc current $I_{AP}$ and/or the peak current retention time $T_{AP}$ with the wire feed rate WFR revealed that $I_{AP}^2 \times T_{AP}$ takes similar values at a given wire feed rate WFR *under stabilized short circuiting transfer of molten drops and in the welding state with a small amount of spatter. This means that the abovementioned condition can be established by setting $I_{AP}$ and $T_{AP}$ so that the energy, that is $I_{AP}^2 \times T_{AP}$, required until the molten drops grow to form a desired size may be set to a predetermined value.* For instance, in those cases where the welding wire feed rate is 3.6 m/min, the values of $\sqrt{I_{AP}^2 \times T_{AP}}$ were about 590. In this connection, plotted in FIG. 14 are the values of $\sqrt{I_{AP}^2 \times T_{AP}}$ at different wire feed rates. As seen therefrom, the values of the peak arc current $I_{AP}$ and the peak current retention time $T_{AP}$ which can ensure a stable arc condition with less spattering can be expressed as a function of the wire feed rate WFR. For example, the value of $\sqrt{I_{AP}^2 \times T_{AP}}$ can be expressed as a linear function of the wire feed rate WFR as shown in FIG. 14. Approximating $\sqrt{I_{AP}^2 \times T_{AP}} = a.WFR + b$ (in which a and b are constants), the value of $\sqrt{I_{AP}^2 \times T_{AP}}$ of suitable $I_{AP}^2$ and $T_{AP}$ can be determined from the wire feed rate WFR.

Figure 15:
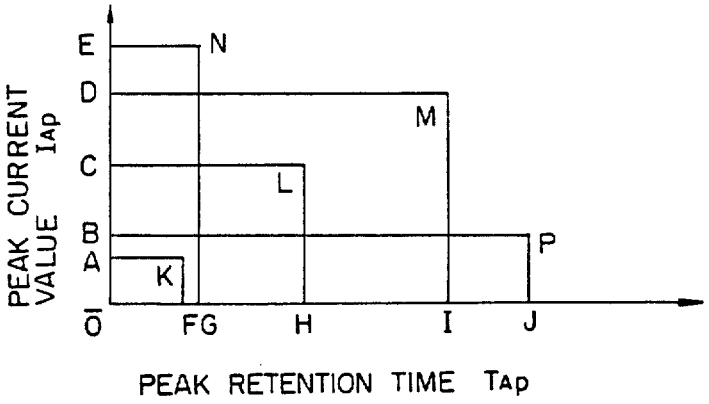
FIG. 15 is a diagram showing the relationship between peak arc current $I_{AP}$ and peak current retention time $T_{AP}$.

With regard to the relationship between the peak current level $I_{AP}$ and the peak current period $T_{AP}$, FIG. 15 shows various ranges defined by different values of peak current $I_{AP}$ and peak current period $T_{AP}$ which shows the following trends.

(1) Range of Low $I_{AP}$ and Short $T_{AP}$ (Range $\bar{O}$AKF)

The energy for forming a droplet is low so that the size of the droplets is small, and, in a case employing a high welding wire feed rate (WFR), an unfused portion of the wire is stuck into the weld pool at the instant of short circuiting, destabilizing the welding operation.

(2) Range of Low $I_{AP}$ and Long $T_{AP}$ (Range $\bar{O}$BPJ)

Although the droplet grows sufficiently, the peak current retention time $T_{AP}$ is too long and therefore the molten droplet is blown off before reaching the weld pool by the repulsive force of the arc at the time of short circuiting, scattering [splatters] *spatters* of large sizes.

(3) Range of High $I_{AP}$ and Short $T_{AP}$ (Range $\bar{O}$ENG)

A long low current ($I_{AB}$) period follows a short peak current retention time $T_{AP}$, so that arc extinction occurs during the low current period in spite of the growth of the molten droplet.

(4) Range of High $I_{AP}$ and Long $T_{AP}$ (Range $\bar{O}$DMI)

The molten droplet tends to grow into a large size, so that the arc burns up in operation with a low welding wire feed rate (WFR), causing burning damage of a contact tip or blowing off the molten droplet to be short-circuited.

Thus, the optimum range of the peak current value $I_{AP}$ and peak current retention time $T_{AP}$, in which the arc is stabilized with a reduced amount of [splatter] *spatter*, is varied depending upon the welding wire feed rate (WFR).

In the welding current control with a constant peak current retention time $T_{AP}$ in the arcing phase, the above-mentioned [splatter] *spatter* reducing effect is sometimes offset by variations in the wire feed rate and wire extension length and changes in the shape or condition of the weld pool. In a control with a fixed peak arc current retention time $T_{AP}$, the arc length is lengthen in the case of welding wire in the peak current period increased by an external disturbance such as an increment of the wire extension or a reduction in the wire feed rate, to prolong the low current period $T_{AB}$ which follows the peak current period $T_{AP}$. Consequently, there occurs a reduction in the number of short circuiting per unit time and an increase in the average welding voltage especially during a weaving operation in a groove. On the contrary, in the event of a reduction in the wire extension length or an increase of the wire feed rate, the low current period is shortened, accordingly inviting an increase in the number of occurrences short circuiting and a reduction in the average welding voltage.

Considering now the variations in the wire extension length alone, the wire melted value MR is expressed by the following equation.

$$MR = T_{AP}(\phi . I_{AP} + Rext . I_{AP}2)/11.1 \ [mm^3]$$

in which $\phi$ is the anode voltage contritubive to the metal melting, the energy for converting a welding wire of 25° C. into molten steel of 1600° C. is 11.1 J/mm$^3$, and Rext is the resistance of the welding wire. Table 3 below shows the melted wire volume during $T_{AP}$ and the corresponding melted wire length at wire extension lengths of 10 mm and 20 mm under conditions where $T_{AP}$=11 msec, $\phi$=4.0 V, $I_{AP}$=300 A and the resistance per unit length of a 1.2 mm diameter welding wire is 1 milliohm/mm.

TABLE 3

| Extension Length [mm] | Melted wire-volume [mm] | Melted Wire Length [mm] |
|---|---|---|
| 10 | 2.08 | 1.84 |
| 20 | 2.97 | 2.63 |

As is clear from the foregoing table, the melted wire volume during $T_{AP}$ for a given welding current is greater at a larger wire extension length, with a greater arc length and a reduced number of occurrences short circuiting. This condition is created by overfeeding of energy in the peak current period and is undesirable from the standpoint of performance quality.

Therefore, for reducing the amount of [splatter] *spatter* and stabilizing the arc in spite of variations in external conditions in a certain range, for example, variations in the wire feed rate or the like, it is preferred to adjust the energy supply to the welding wire to an appropriate value by prolonging or shortening the peak current period $T_{AP}$ *and/or increasing or decreasing the peak current* $I_{AP}$ in the arcing phase. The overfeed or underfeed of energy in the peak current period $T_{AP}$ can be detected, for example, from variations in the length of the low current period $T_{AB}$, variations in the sum of the peak and low current periods $T_{AP}$ and $T_{AB}$, variations in the number of occurrences short circuiting or variations in the average arc voltage.

Alternatively, the peak current $I_{AP}$ of the arcing phase may be controlled in terms of current-voltage characteristics to prevent the occurrence of short circuiting or excessive are length in the peak current period $T_{AP}$, controlling the current increase or decrease resulting from variations in welding voltage at a rate higher than 10 A/V.

In order to prevent short circuiting in the peak current period $T_{AP}$ of the arcing phase, the welding voltage in the peak current period should be controlled to approach as closely as possible to constant potential characteristics to maintain the arc length constantly at an appropriate value. For this purpose, the output of a welding power source is controlled in such a manner as to hold the decrease of welding current due to an increase in welding voltage or the increase of welding current due to a reduction in welding voltage at a rate K greater than a predetermined value in the peak current period.

In this instance, presetting an appropriate arc voltage $V_{REF}$ and arc current Io for the peak current period $T_{AP}$, the welding current $I_{AP}$ in the peak current period $T_{AP}$ is corrected on the basis of deviation of an actual arc voltage $V_{FB}$, according to the following equation.

$$I_{AP} = K(V_{REF} - V_{FB}) + Io$$

Figure 16:
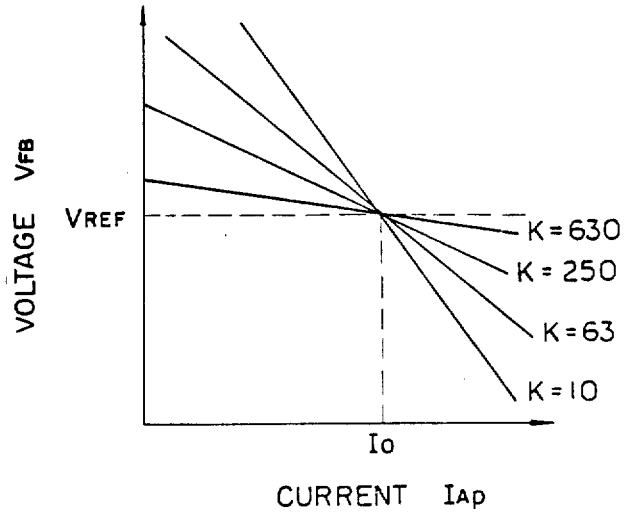
FIG. 16 is a diagram showing the relationship between welding voltage and current at different rates of welding current variations.

As a result of experiments employing different rates K of welding current variation in the peak current period $T_{AP}$ as shown in FIG. 16, it has been revealed that the amount of [splatter] *spatter* is reduced and the performance quality is improved when the current reduction rate due to an increase of voltage in the peak current period is greater than 10 A/V, especially when the reduction rate is greater than 63 A/V. By controlling the peak current $I_{AP}$ in this manner in terms of current-voltage characteristics, it becomes possible to lessen remarkably the possibilities of short circuiting in the peak current period $T_{AP}$ of arcing phase as compared with the constant current control. Consequently, the fusing rate of the welding wire is lowered, making it possible to reduce the arc length and the size of molten drops to prevent [splattering] *spattering* of large droplets. Besides, the increase in the frequency of short circuiting is accelerated to eliminate the arc flickering phenomenon, coupled with an effect of maintaining a constant distance between the tip end of the welding wire and molten weld thereby preventing vibratory movements of the molten weld and regulating the bead appearance.

Although the method of the present invention has been described by way of preferred embodiments, it is to be understood that the invention is not limited to the particular forms shown, and various alterations or modification can be made within the scope of the invention as defined in the following claims.

What is claimed is:

1. A method for controlling the output of a power source in consumable electrode arc welding in which a short circuiting phase and an arcing phase alternately take place between a consumable electrode and a workpiece in a shielding gas atmosphere, which comprises:

a first stage of maintaining the output welding current at a first value at a relatively low level upon establishment of a short circuit across a gap between said consumable electrode and said workpiece;

a second stage of maintaining the welding current at a second value at a relatively high level subsequent to the first stage;

a third stage of lowering the welding current to a third value at a low level upon detection of necking as a premonition of rupture of short circuiting molten metal between said electrode and said workpiece;

a fourth stage of, upon generation of an arc across said gap between said electrode and workpiece subsequent to the third stage, maintaining the welding current at a fourth value at a relatively high level exceeding the value of average welding current and controlling the [duration] *value* of said high level current as a function of the feed rate of said consumable electrode; and a fifth stage of maintaining the welding current at a fifth value at a relatively low level until said gap between said electrode and workpiece is short-circuited, under control of substantially constant current characteristics so as to feed current of a constant level irrespective of variations in arc length.

2. The method of claim 1, which further comprises altering the retention time of supplying the current of said first value in the first stage depending upon whether or not an arc is present across said gap between said electrode and said workpiece immediately before establishment of a short circuit.

3. The method of claim 2, which further comprises detecting the presence of an arc immediately before establishment of a short circuit from a variation in welding voltage.

4. The method of claim 2, which further comprises detecting the presence of an arc immediately before establishment of a short circuit from a variation in welding current.

5. The method of claim 2, wherein the retention time of supplying said current of the first value is lengthened when an arc is present immediately before short circuiting, and shortened when absent.

6. The method of claim 1, which further comprises sequentially detecting the welding voltage and lowering the welding current to said third value in said third stage as soon as a value of $V=V_M-V_L$ reaches a predetermined value, in which $V_L$ is the lowest voltage in the second stage and $V_M$ is a voltage occurring at a subsequent point in time in the second stage.

7. The method of claim 1, which further comprises sequentially detecting the welding voltage and lowering the welding current to said third value in said third stage as soon as the value $\Delta V=V_M-(V_L+V_N)$ reaches a predetermined value, in which $V_L$ is the lowest voltage in the second stage. $V_M$ is a voltage occurring at a subsequent point in time in the second stage, and $V_N$ is a voltage variation caused by a variation in resistance upon welding wire extension.

8. The method of claim 1, which further comprises controlling the welding current in said second stage as a function of the feed rate of said consumable electrode.

9. The method of claim 1, which further comprises controlling the [duration] *value* of the high level current of said fourth stage according to a condition in a preceding cycle of operation.

10. The method of claim 9, which further comprises controlling the [duration] *value* of the high level current of said fourth stage according to a length of the low level current period in said fifth stage in a preceding cycle of operation.

11. The method of claim 9, which further comprises controlling the [duration] *value* of the high level current of said fourth stage according to a sum of a high and low level current periods in said fourth and fifth stages in a preceding cycle of operation.

12. The method of claim 9, which further comprises controlling the [duration] *value* of the high level current of said fourth stage in a next cycle of operation according to the number of occurrences of short circuiting per unit time.

13. The method of claim 9, which further comprises controlling the [duration] *value* of the high level current of said fourth stage in a next cycle of operation according to the mean value of arc voltage.

14. The method of claim 1, which further comprises controlling a rate of current decrement or increment due to an increase or decrease in voltage across the gap between said consumable electrode and said workpiece in said fourth stage at a value greater than 10 A/V.

* * * * *